(12) United States Patent
Shin et al.

(10) Patent No.: US 10,070,367 B2
(45) Date of Patent: Sep. 4, 2018

(54) SOURCE, RELAY, AND DESTINATION EXECUTING COOPERATION TRANSMISSION AND METHOD FOR CONTROLLING EACH THEREOF

(71) Applicants: SAMSUNG ELECTRONICS CO., LTD., Suwon-si (KR); Cornell University, Ithaca, NY (US)

(72) Inventors: Won-Jae Shin, Seoul (KR); Ilan Shomorony, Ithaca, NY (US); Amir Salman Avestimehr, Ithaca, NY (US); Chang Yong Shin, Seoul (KR); Jong Bu Lim, Yongin-si (KR); Won Jong Noh, Seoul (KR)

(73) Assignees: SAMSUNG ELECTRONICS CO., LTD., Suwon-si (KR); Cornell University, Ithaca, NY (US)

( * ) Notice: Subject to any disclaimer, the term of this patent is extended or adjusted under 35 U.S.C. 154(b) by 115 days.

(21) Appl. No.: 14/061,007

(22) Filed: Oct. 23, 2013

(65) Prior Publication Data

US 2014/0112340 A1  Apr. 24, 2014

Related U.S. Application Data

(60) Provisional application No. 61/717,210, filed on Oct. 23, 2012.

(30) Foreign Application Priority Data

Sep. 2, 2013 (KR) .................. 10-2013-0104947

(51) Int. Cl.
*H04W 40/02* (2009.01)
*H04B 7/155* (2006.01)

(52) U.S. Cl.
CPC ........ *H04W 40/02* (2013.01); *H04B 7/15592* (2013.01)

(58) Field of Classification Search
CPC ..................................................... H04W 40/02
See application file for complete search history.

(56) References Cited

U.S. PATENT DOCUMENTS 8,838,020 B2 * 9/2014 Maddah-Ali ........ H04B 7/1555
455/11.1
2003/0021363 A1 * 1/2003 Lee ....................... H04L 25/069
375/340

(Continued)

FOREIGN PATENT DOCUMENTS

KR  10-2010-0113288 A  10/2010

OTHER PUBLICATIONS

"A Decomposition Approach to MIMO Interference Relay Networks", Mohammad Ali Torabi and Jean-Francois Frigon, 2008, IEEE Globecom, pp. 1-6.*

(Continued)

*Primary Examiner* — Brandon M Renner
*Assistant Examiner* — Jay L Vogel
(74) *Attorney, Agent, or Firm* — Sughrue Mion, PLLC

(57) ABSTRACT

A method for controlling a first node transmitting a transmission message to a plurality of second nodes may be provided. The method includes dividing the transmission message into at least one sub-message, encoding the at least one sub-message to a data stream, determining a first transmission direction of the data stream toward at least one of the plurality of second nodes, based on a polynomial of a channel gain between the first node and the at least one of the plurality of second nodes, and transmitting the data stream to the at least one of the plurality of second nodes, based on the determined first transmission direction.

15 Claims, 11 Drawing Sheets

(56) References Cited

U.S. PATENT DOCUMENTS

| | | | |
|---|---|---|---|
| 2006/0056338 A1* | 3/2006 | Abe | H04B 7/026 370/328 |
| 2006/0233265 A1* | 10/2006 | Rajan | H04L 1/0002 375/259 |
| 2007/0054621 A1* | 3/2007 | Larsson | H04B 7/022 455/67.11 |
| 2007/0217432 A1 | 9/2007 | Molisch et al. | |
| 2008/0165720 A1* | 7/2008 | Hu et al. | 370/315 |
| 2008/0274692 A1* | 11/2008 | Larsson | H04B 7/15592 455/24 |
| 2009/0028264 A1* | 1/2009 | Zhang | H04L 1/0606 375/267 |
| 2009/0047901 A1* | 2/2009 | Yu | H04B 7/022 455/7 |
| 2009/0097432 A1* | 4/2009 | Kwon | H04W 40/02 370/315 |
| 2009/0296626 A1* | 12/2009 | Hottinen | H04B 7/155 370/315 |
| 2011/0051837 A1 | 3/2011 | Park et al. | |
| 2011/0212684 A1* | 9/2011 | Nam | H04B 7/022 455/7 |
| 2011/0216662 A1* | 9/2011 | Nie et al. | 370/252 |

OTHER PUBLICATIONS

Salma Ait Fares, "Joint Cooperative Diversity and Scheduling in OFDMA Relay System", Tohoku University, Japan, 2010, pp. 215-218.*

Search Report dated Jan. 28, 2014, issued by the International Searching Authority in counterpart International Application No. PCT/KR2013/009476.

Written Opinion dated Jan. 28, 2014, issued by the International Searching Authority in counterpart International Application No. PCT/KR2013/009476.

Luo, et al.; "Link-Failure Probabilities for Practical Cooperative Relay Networks", Vehicular Technology Conference, May 30-Jun. 1, 2005, vol. 3, pp. 1489-1493.

* cited by examiner

SOURCE, RELAY, AND DESTINATION EXECUTING COOPERATION TRANSMISSION AND METHOD FOR CONTROLLING EACH THEREOF

CROSS-REFERENCE TO RELATED APPLICATIONS

This application claims priority from U.S. Provisional Application No. 61/717,210, filed on Oct. 23, 2012 in the U.S. Patent and Trademark Office, and Korean Patent Application No. 10-2013-0104947, filed on Sep. 2, 2013 in the Korean Intellectual Property Office, the disclosures of which are incorporated herein by reference in their entireties.

BACKGROUND

1. Field

Apparatuses and methods consistent with embodiments relate to a source, relay, and destination executing cooperation transmission and a method for controlling each thereof, and more particularly, to a source, relay, and destination neutralizing interference when executing cooperation transmission and a method for controlling each thereof.

2. Description of the Related Art

Recently, there has been progress and developments in the area of cooperation transmission. In transmission cooperation, a plurality of source nodes may transmit a signal to be received by a plurality of destination nodes. Further, when transmission from the plurality of sources to the plurality of destination nodes is a multiple hop transmission, a relay node that relays transmissions between a source and a destination may be provided.

Additionally, relay related technologies have been developed based on an assumption in which the number of sources and destinations correspond to "1" each. Accordingly, these relay related technologies tend to place a great emphasis on enhancing a diversity gain or a multiplexing gain.

SUMMARY

According to an aspect of an exemplary embodiment, there is provided a method for controlling a first node transmitting a transmission message to a plurality of second nodes. The method may include dividing the transmission message into at least one sub-message, encoding the at least one sub-message to a data stream, determining a first transmission direction of the data stream toward at least one of the plurality of second nodes, based on a polynomial of a channel gain between the first node and the at least one of the plurality of second nodes, and transmitting the data stream to the at least one of the plurality of second nodes, based on the determined first transmission direction.

The first node may be one of a plurality of source nodes.

The transmission direction may be determined by a polynomial of a channel gain between the plurality of source nodes and the plurality of second nodes.

The encoding may include encoding the at least one sub-message, based on a Gaussian random codebook.

The channel gain between the first node and the at least one of the plurality of second nodes may vary with time.

The channel gain between the first node and the at least one of the plurality of second nodes may vary based on a unit of a predetermined number of time slots, and wherein the transmitting of the data stream to the plurality of second nodes includes transmitting the data stream during the predetermined number of time slots.

According to an aspect of another exemplary embodiment, there is provided a method for controlling a relay node relaying a signal between a plurality of source nodes and a plurality of destination nodes. The method may include receiving, from a first transmission direction, a data stream from at least one of the plurality of source nodes, extracting at least one relay signal from the received data stream, determining a second transmission direction of the at least one relay signal toward at least one of the plurality of destination nodes, based on a polynomial of a channel gain between the relay node and the plurality of destination nodes, and transmitting the at least one relay signal to at least one of the plurality of destination nodes, based on the determined second transmission direction.

The extracting of the at least one relay signal may include extracting a transmission scheme for the at least one relay signal that is identical to a transmission scheme used by the plurality of source nodes to transmit the data stream.

The relay node may be one of a plurality of relay nodes.

The determining of the second transmission direction may include verifying a channel gain between the plurality of relay nodes and the plurality of destination nodes, generating a first matrix using the channel gain, generating a second matrix, wherein the second matrix is an inverse matrix of the first matrix, and determining a polynomial of an element of the second matrix to be the second transmission direction.

A channel gain between the plurality of source nodes and the relay node and the channel gain between the relay node and the plurality of destination nodes may vary with time.

The channel gain between the plurality of source nodes and the relay node and the channel gain between the relay node and the plurality of destination nodes may vary based on a unit of a predetermined number of time slots, and wherein the transmitting of the at least one relay signal to the plurality of destination nodes includes transmitting the at least one relay signal during the predetermined number of time slots.

According to an aspect of another exemplary embodiment, there is provided a method for controlling a destination node communicating with a plurality of relay nodes relaying a message encoded in a plurality of source nodes. The method may include receiving a relay signal from the plurality of relay nodes, estimating a data stream from the relay signal received from the plurality of relay nodes, based on a channel gain between the plurality of relay nodes and the destination node, decoding the estimated data stream, and outputting the decoded message.

The destination node may be one of a plurality of destination nodes.

The estimating of the data stream may include determining a relay direction between the plurality of relay nodes and the plurality of destination nodes, determining a third matrix based on the relay direction, vector-multiplying an inverse matrix of the third matrix and the received relay signal, and estimating the data stream based on a result of the vector-multiplication.

The relay direction may be based on a polynomial of an element of a second matrix, wherein the second matrix is an inverse matrix of a first matrix obtained through changing to form the first matrix from a channel gain between the plurality of relay nodes and the plurality of destination nodes.

The channel gain between the plurality of relay nodes and the destination node may vary with time.

The channel gain between the plurality of relay nodes and the destination node may vary based on a unit of a predetermined number of time slots, and wherein the receiving of the relay signal includes receiving the at least one relay signal during the predetermined number of time slots.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1A:
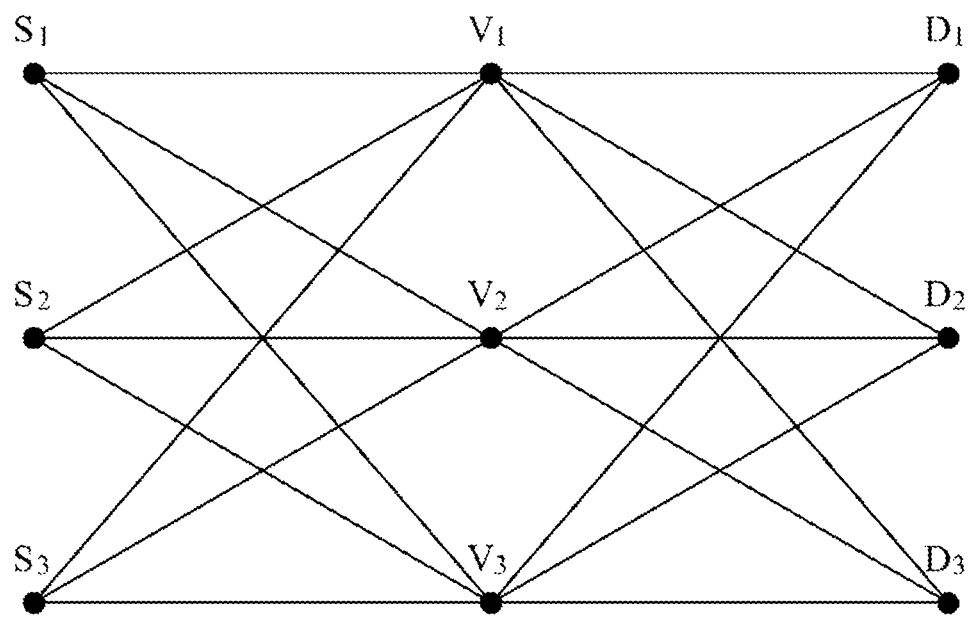
FIG. 1A is a conceptual diagram which illustrates cooperation transmission according to an exemplary embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 1A illustrates cooperation transmission according to an exemplary embodiment.

Referring to FIG. 1A, a first source node $S_1$ may perform communication with a first relay node $V_1$, a second relay node $V_2$, and a third relay node $V_3$, respectively. A second source node $S_2$ may also perform communication with the first relay node $V_1$, the second relay node $V_2$, and the third relay node $V_3$, respectively. Further, a third source node $S_3$ may also perform communication with the first relay node $V_1$, the second relay node $V_2$, and the third relay node $V_3$, respectively.

A communication scheme may not be limited to the first source node $S_1$ through the third source node $S_3$ and the first relay node $V_1$ through the third relay node $V_3$. For example, the first source node $S_1$ through the third source node $S_3$ may include at least one of a wireless local area network (WLAN) module and a near field communication (NFC) module. In a specific example, the WLAN module may be connected to the Internet and may be based on controlling the first source node $S_1$ through the third source node $S_3$. The WLAN module may support a WLAN standard, for example, Institute of Electrical and Electronics Engineers (IEEE) 802.11x. The NFC module may wirelessly perform NFC based on the controlling of the first source node $S_1$ through the third source node $S_3$. The NFC scheme may include at least one of Bluetooth, infrared data association (IrDA), wireless fidelity (Wi-Fi) direct, Zig-bee communication, Bluetooth low energy (BLE), NFC, and visible light communication, and a claimed range may be readily understood by those skilled in the art as not being limited to the NFC scheme.

When the first source node $S_1$ through the third source node $S_3$ perform communication based on a predetermined communication scheme, the first relay node $V_1$ through the third relay node $V_3$ and a first destination node $D_1$ through a third destination node $D_3$ may also include a module for conducting communication based on a corresponding communication scheme.

Alternatively, the first source node $S_1$ through the third source node $S_3$ may be connected to the first relay node $V_1$ through the third relay node $V_3$ through a wired connection. Also, the first relay node $V_1$ through the third relay node $V_3$ may be connected to the first destination node $D_1$ through the third destination node $D_3$ through a wired connection.

The first source node $S_1$ may transmit a data stream to the first relay node $V_1$ through the third relay node $V_3$. More particularly, the first source node $S_1$ may transmit a first data stream to the first relay node $V_1$, transmit a second data stream to the second relay node $V_2$, and transmit a third data stream to the third relay node $V_3$.

The first source node $S_1$ may generate at least one data stream through dividing and encoding a transmission message input.

The first source node $S_1$ may determine a transmission direction of the generated at least one data stream. The first source node $S_1$ may determine each transmission direction of the generated at least one data stream, based on a channel gain between the first source node $S_1$ through the third source node $S_3$ and the first relay node $V_1$ through the third relay node $V_3$, which will be discussed in greater detail later. According to an exemplary embodiment, components of channel gain may include at least one of path loss, multipath fading, shadowing, and sometimes interference or other impairments.

The first source node $S_1$ may transmit the first data stream to the first relay node $V_1$, transmit the second data stream to the second relay node $V_2$, and transmit the third data stream to the third relay node $V_3$, corresponding to the determined transmission direction. Here, ordinal numbers of the first, second, and third data streams may indicate data streams to be transmitted to the first, second, and third relay nodes, respectively, rather than a sequential order of generation.

The second source node $S_2$ and the third source node $S_3$ may perform an operation of the first source node $S_1$. For example, the second source node $S_2$ may transmit a fourth data stream to the first relay node $V_1$, transmit a fifth data stream to the second relay node $V_2$, and transmit a sixth data stream to the third relay node $V_3$. Also, the third source node $S_3$ may transmit a seventh data stream to the first relay node $V_1$, transmit an eighth data stream to the second relay node $V_2$, and transmit a ninth data stream to the third relay node $V_3$.

The first relay node $V_1$ may receive the first data stream from the first source node $S_1$, receive the fourth data stream from the second source node $S_2$, and receive the seventh data stream from the third source node $S_3$. The second relay node $V_2$ may receive the second data stream from the first source node $S_1$, receive the fifth data stream from the second source node $S_2$, and receive the eighth data stream from the third source node $S_3$. The third relay node $V_3$ may receive the third data stream from the first source node $S_1$, receive the sixth data stream from the second source node $S_2$, and receive the ninth data stream from the third source node $S_3$.

The first relay node $V_1$ may extract a relay signal arrayed from the received data streams. In this example, the relay signal may correspond to a signal to be transmitted, from the first relay node $V_1$, to at least one of the first destination node $D_1$ through the third destination node $D_3$.

The first relay node $V_1$ may verify a channel gain between the first source node $S_1$ and the first relay node $V_1$, a channel gain between the second source node $S_2$ and the first relay node $V_1$, and a channel gain between the third source node $S_3$ and the first relay node $V_1$.

The first relay node $V_1$ may extract the arrayed relay signal, based on the transmission direction of the data stream and the verified channel gain. Particularly, the first relay node $V_1$ may extract a plurality of relay signals to enable a transmission scheme identical to a transmission scheme in the first source node $S_1$ through the third source node $S_3$, respectively, and the extraction of the relay signal will be discussed in greater detail later. In particular, the "arraying" in the arrayed relay signal may indicate that a relay signal is arrayed so as to be identical to the transmission scheme at the source.

The first relay node $V_1$ may determine a transmission direction of the plurality of extracted relay signals. The first relay node $V_1$ may determine the transmission direction of the plurality of relay signals, based on a channel gain between the first relay node $V_1$ through the third relay node $V_3$ and the first destination node $D_1$ through the third destination node $D_3$, respectively. The determining of the transmission direction of the plurality of relay signals will be discussed in greater detail later.

The first relay node $V_1$ may transmit a relay signal based on the determined transmission direction.

The second relay node $V_2$ and the third relay node $V_3$ may perform operation of the first relay node $V_1$, respectively.

The first destination node $D_1$ may receive a relay signal from the first relay node $V_1$ through the third relay node $V_3$, respectively.

The first destination node $D_1$ may estimate a data stream based on a channel gain between the first relay node $V_1$ through the third relay node $V_3$ and the first destination node $D_1$ through the third destination node $D_3$, respectively, and the estimating of the data stream will be discussed in greater detail later.

The first destination node $D_1$ may decode the estimated data stream, and output a decoded message.

The second destination node $D_2$ and the third destination node $D_3$ may perform operation of the first destination node $D_1$, respectively.

As described above, the respective numbers of the sources, relays, and destinations of "1" are provided as an example only, and are not limited to those set forth herein and thus, may be changed as is known in the art.

Figure 1B:
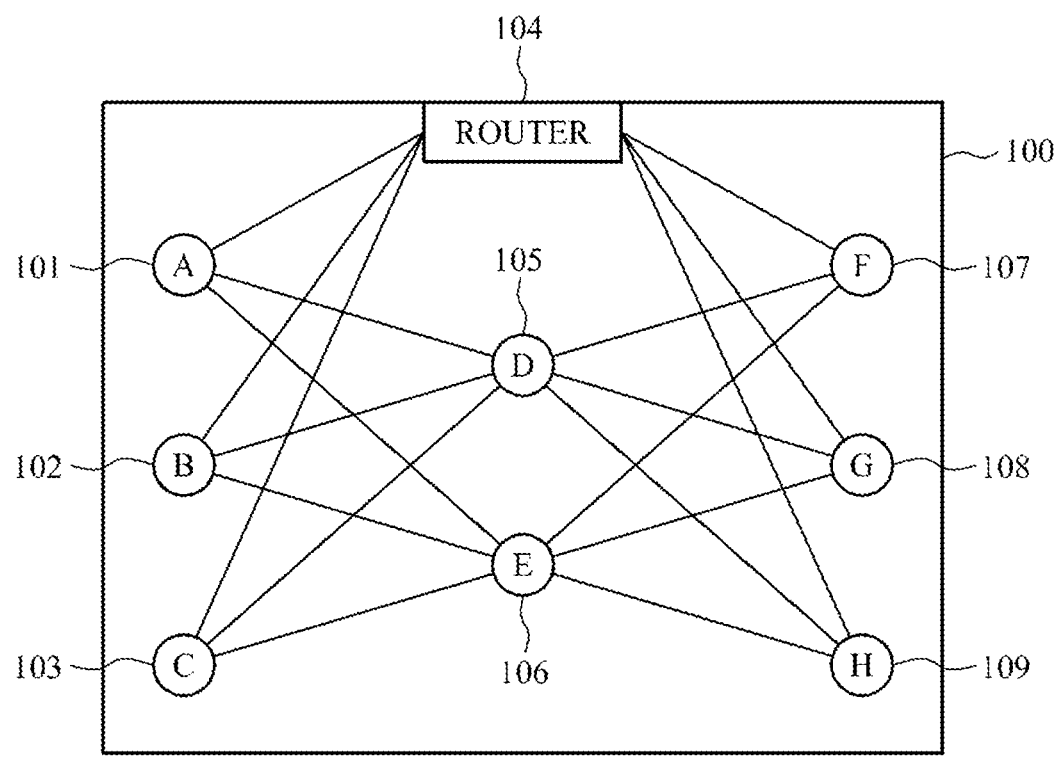
FIG. 1B is a conceptual diagram which illustrates an implementation example according to an exemplary embodiment.

FIG. 1B illustrates an implementation example according to an exemplary embodiment. Referring to FIG. 1B, a terminal A 101 through a terminal H 109 may be disposed at a distance at which communication is possible. Also, a router 104 may be disposed at a distance at which communication is possible with the terminal A 101 through the terminal H 109.

In this instance, the terminal A 101, the terminal B 102, and the terminal C 103 may be source nodes, and may transmit a predetermined message. The terminal A 101, the terminal B 102, and the terminal C 103 may transmit a data stream.

The terminal D 105 and the terminal E 106 may be, for example, relay nodes and may receive a data stream from the terminal A 101, the terminal B 102, and the terminal C 103. The terminal D 105 and the terminal E 106 may be device to device (D2D) connected to the terminal A 101, the terminal B 102, and the terminal C 103.

The router 104, which may be, for example, a relay node and may receive a data stream from the terminal A 101, the terminal B 102, and the terminal C 103.

The router 104, the terminal D 105, and the terminal E 106 may extract a relay signal to transmit the extracted relay signal to the terminal F 107, the terminal G 108, and the terminal H 109, respectively. The terminal D 105 and the terminal E 106 may be D2D connected to the terminal F 107, the terminal G 108, and the terminal H 109.

The terminal F 107, the terminal G 108, and the terminal H 109 may be, for example, destination nodes and may receive a relay signal from the router 104, the terminal D 105, and the terminal E 106, respectively.

The terminal F 107, the terminal G 108, and the terminal H 109 may estimate a data stream from the received relay signal. Also, the terminal F 107, the terminal G 108, and the terminal H 109 may output a message transmitted from the terminal A 101, the terminal B 102, and the terminal C 103, respectively, based on the estimated data stream.

Figure 2:
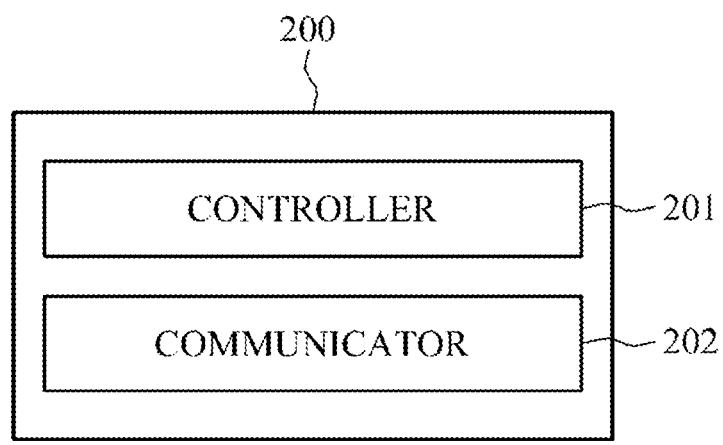
FIG. 2 is a block diagram which illustrates a node according to an exemplary embodiment.

FIG. 2 illustrates a node 200 according to an exemplary embodiment. The node 200 may operate as a source node, a relay node, or a destination node. The node 200 may include a controller 201 and a communicator 202.

The controller 201 may include a central processing unit (CPU), a read only memory (ROM) in which a control program for controlling is stored, and a random access memory (RAM) in which a signal or data input externally from the node 200 is stored, or may be used as a memory domain for operation performed in the node 200. The CPU may include a single core, a dual core, a triple core, or a quad core. The CPU, ROM, and RAM may be mutually connected via an internal bus.

The controller 201 may control the communicator 202.

Also, the controller 201 may perform encoding, and decoding performed in the node 200. Alternatively, the controller 201 may perform operations, for example, division of a message, determination of a transmission direction, extraction of a relay signal, and verification of a channel gain.

The communicator 202 may include at least one of a wireless module and an NFC module. The communicator 202 may perform transmission of a data stream, reception of a data stream, transmission of a relay signal, and reception of a relay signal.

Figure 3:
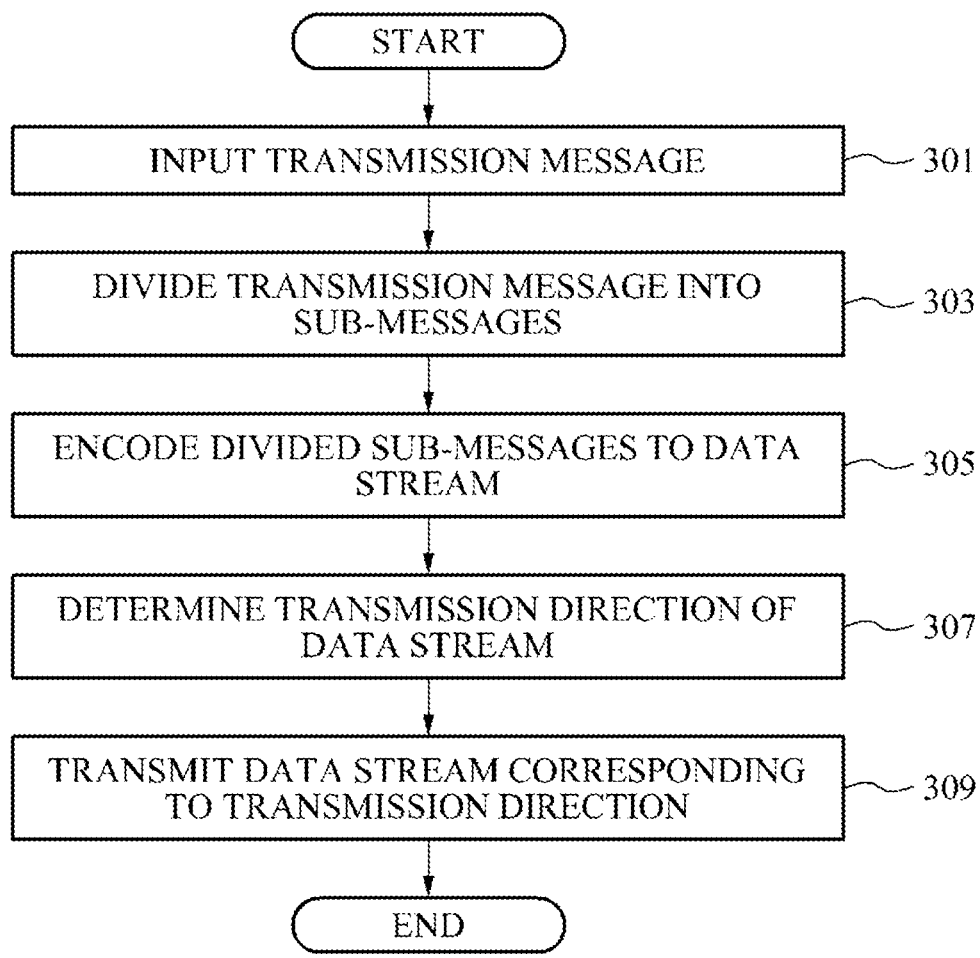
FIG. 3 is a flowchart which illustrates an operation of a source node according to an exemplary embodiment.

FIG. 3 illustrates an operation of a source node according to an exemplary embodiment.

In operation 301, the source node may receive an input of a transmission message.

The source node of FIG. 3 may be one of a plurality of source nodes. Accordingly, a source node having an i-th index may be represented as $S_i$. "i" may be an integer in a range of "1" to less than "K". For example, a number of the plurality of source nodes may be "K".

Also, a transmission message to be input to the source node $S_i$ may be represented as $W_i$.

In operation 303, the source node may divide a transmission signal, or transmission message, into a plurality of sub-signals, or sub-messages. In particular, the source node may divide the transmission message $W_i$ into a number of "L". For example, "L" may be $N^{K^2}$, and "N" may be a predetermined integer.

In operation 305, the source node may encode a divided sub-message to a data stream. The source node may perform the encoding using a Gaussian random codebook with a length of, for example, "n".

Figure 4:
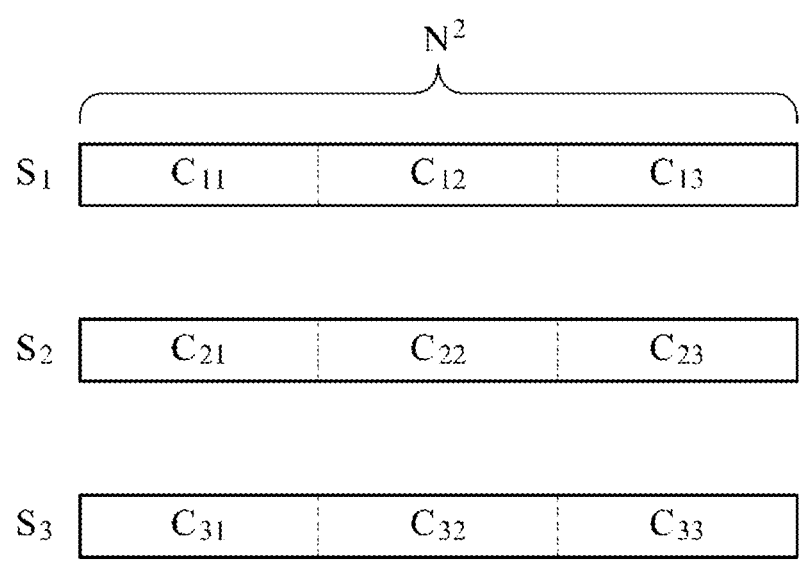
FIG. 4 is a conceptual diagram which illustrates a divided sub-message according to an exemplary embodiment

Particularly, FIG. 4 illustrates a divided sub-message according to an exemplary embodiment.

Referring to FIG. 4, a transmission message $W_1$ input to a source node $S_1$ may be encoded through being divided into three sub-messages. An encoded data stream may be represented as $c_{ij}$. In this example, "i" refers to being encoded in a source node having an i-th index, and "j" refers to a j-th index from among the divided sub-messages. For example, $c_{22}$ refers to a data stream obtained through encoding a second sub-message from sub-messages divided from a transmission message input to a second source node $S_2$.

Figure 5:
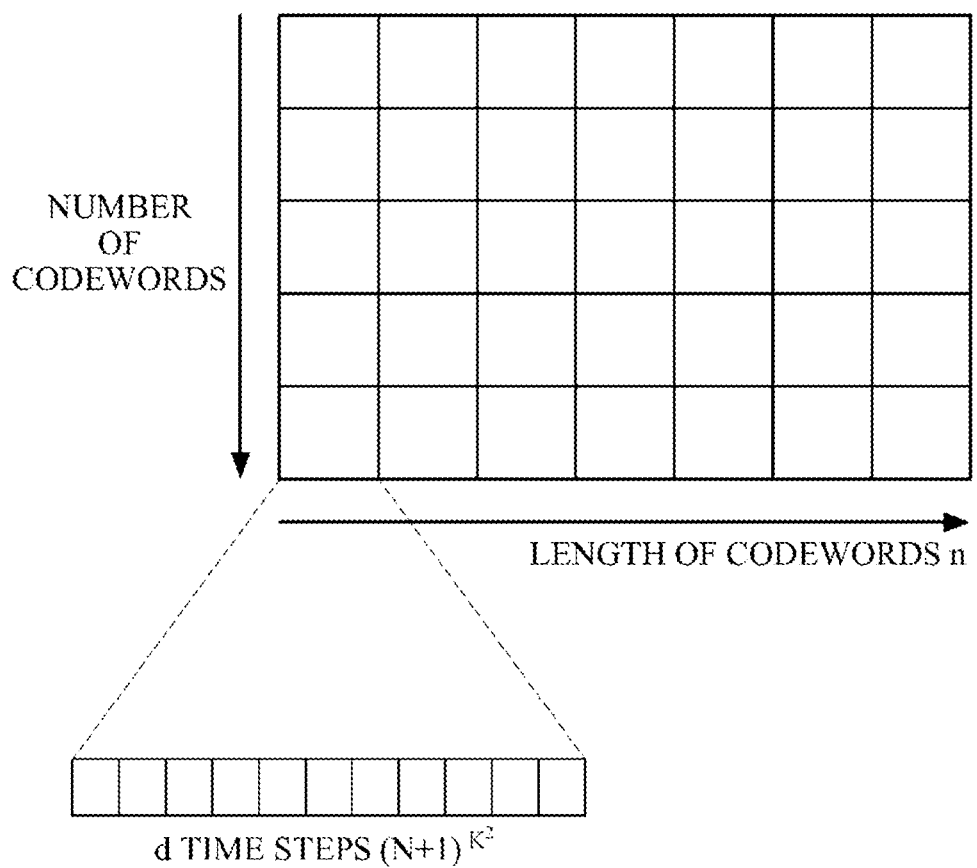
FIG. 5 is a conceptual diagram which illustrates Gaussian random codebook encoding according to an exemplary embodiment.

For example, FIG. 5 specifically illustrates a Gaussian random codebook encoding according to an exemplary embodiment. Particularly, in FIG. 5, a single block may be divided into a plurality of code words, such as a vertical axis, and the plurality of divided code words may have an "n" length. A code word having a single unit length may be sequentially transmitted during a "d" number of time steps, and "d" may correspond to $N^{K^2}$.

Referring back to FIG. 3, in operation 307, a source node may determine a transmission direction of a data stream. The source node may determine the transmission direction of the data stream based on a channel gain between a plurality of source nodes and a plurality of relay nodes.

For example, the source node may determine the transmission direction "T" as represented by Equation 1.

$$T_{s_{11},s_{12},\ldots,s_{KK}}[t] = \prod_{\substack{1 \le i \le K \\ 1 \le j \le K}} h_{S_i,V_j}[t]^{s_{ij}} \quad \text{[Equation 1]}$$

Here, $s_{11}$, $s_{12}$ through $s_K$ denote a single integer from among "0" through "N−1".

On a right side of Equation 1, $S_i$ denotes an i-th source node, and $V_j$ denotes a j-th relay node. In particular, $hS_iV_j$ denotes a channel gain between the i-th source node and the j-th source node. Also, [t] denotes a variation with time of the channel gain.

On the right side of Equation 1, the transmission direction may be represented in a form of a polynomial of a channel gain between a source node and a relay node. In particular, the polynomial of the channel gain may refer to a form of a multiplication of exponential polynomials in which the channel gain is a base.

Also, a set of the aforementioned transmission directions may be determined as given by Equation 2.

$$\mathcal{T}_N[t]=\{T_{s_{11},s_{12},\ldots,s_{KK}}[t]:(s_{11},s_{12},\ldots,s_{KK})\in\Delta_N\} \quad \text{[Equation 2]}$$

In Equation 2, $\mathcal{T}_N[t]$ denotes a set of transmission directions, and $\Delta_N=\{0,\ldots,N-1\}^{K^2}$.

Accordingly, a number "L" of transmission directions available may be defined by Equation 3.

$$L=|\mathcal{T}_N[t]|=|\Delta_N|=N^{K^2} \quad \text{[Equation 3]}$$

For increased clarity and conciseness, $(s_{11}, s_{12}, \ldots, s_{KK})$ may be represented as a vector $\vec{s}$. Further, $T_{s_{11},s_{12},\ldots,s_{KK}}$ may be represented as $T_{\vec{s}}$.

In operation 309, the source node may transmit the data stream corresponding to the transmission direction.

The source node may transmit the data stream during an "nd" time slot, for example, and $d \triangleq (N+1)^{K^2}$. Also, an (m+1)-th symbol of a codeword associated with a sub-message of a stream $\vec{s}$ of an i-th source node may be represented as $c_{i,\vec{s}}[m]$. Here, "m" may be an integer greater than "0" less than "n−1".

The source node may transmit a signal as shown in FIG. 4, during a "t=md+j" time slot. "m" may be an integer greater than "0" less than "d−1", and "j" may be an integer greater than "0" less than "d−1".

$$X_{S_i}[t] = \gamma \sum_{\vec{s} \in \Delta_N} T_{\vec{s}}[t] c_{i,\vec{s}}[m] \quad \text{[Equation 4]}$$

$\gamma$ denotes a transmission power constraint constant of a source node.

Hereinafter, an instance in which a data stream to be relayed to a destination node is received from a relay node will be described.

Figure 7:
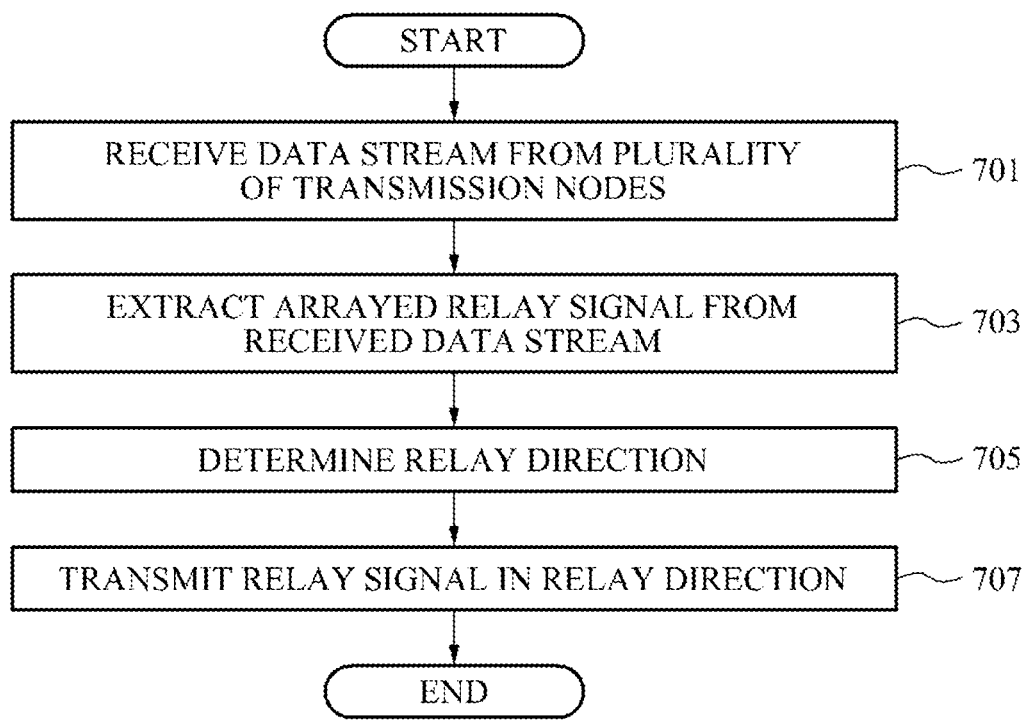
FIG. 7 is a flowchart which illustrates an operation of a relay node according to an exemplary embodiment.

Particularly, FIG. 7 illustrates an operation of a relay node according to an exemplary embodiment.

In operation 701, the relay node may receive a data stream from a plurality of source nodes.

For example, a signal received by a j-th relay $V_j$ during a time of "t=md+j" may be expressed by Equation 5.

$$Y_{V_j}[t] = \gamma \sum_{\vec{s} \in \Delta_N} T_{\vec{s}}[t] \left( \sum_{i=1}^{K} h_{S_i,V_j}[t] c_{i,\vec{s}}[m] \right) + Z_{V_j}[t] \quad \text{[Equation 5]}$$

On a left side of Equation 5, $Y_{V_j}[t]$ denotes a signal received during a "t" time in the j-th relay node $V_j$. Also, entire signals transmitted from a plurality of source nodes $S_i$, "i" being in a range of "1" to "K", may be verified to be appraised in a sum with respect to "i" as shown in $$\left( \sum_{i=1}^{K} h_{S_i,V_j}[t] c_{i,\vec{s}}[m] \right).$$

More particularly, $T_{\vec{s}}[t]$ may be independent with respect to "i", and as a result, $T_{\vec{s}}[t]$ may be verified to be written outside of the summation with respect to "i". $Z_{V_j}[t]$ denotes a noise component present during a "t" time in the j-th relay node $V_j$.

Equation 5 may be represented by Equation 6 through variable substitution.

$$Y_{V_j}[t] = \gamma \sum_{\vec{s} \in \Delta_{N+1}} T_{\vec{s}}[t] u_{j,\vec{s}}[m] + Z_{V_j}[t] \quad \text{[Equation 6]}$$

Equation 6 has a substitution relationship as represented in $u_{j,(s_{11}, s_{12}, \ldots, s_{KK})}[m] = \sum_{i=1}^{K} c_{i,(s_{11}, s_{12}, \ldots, s_{ij}-1, \ldots, s_{KK})}[m]$.

In Equation 6, when a component of $\vec{s}$ corresponds to "$-1$" or "N", $c_{i,\vec{s}}[m]$ may be set to "0".

In operation 703, the relay node may extract a relay signal arrayed from the received data stream.

Figure 6:
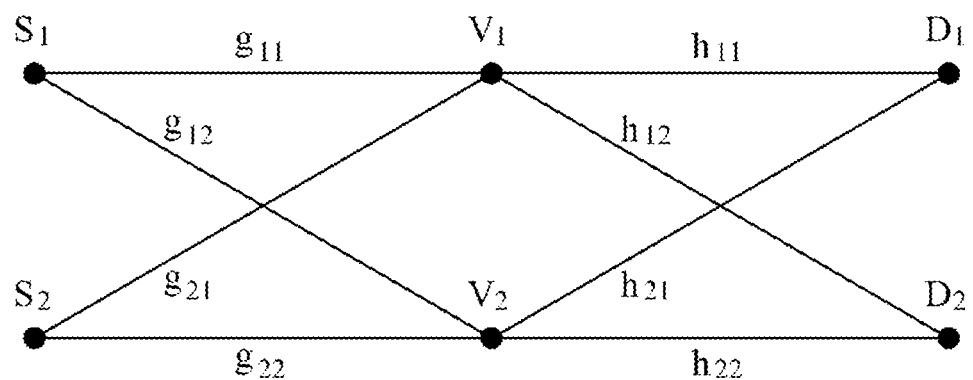
FIG. 6 is a conceptual diagram which illustrates an instance in which a source-relay-destination of 2×2×2 participates in cooperation transmission according to an exemplary embodiment.

As described above, the relay node may extract the relay signal to enable a transmission scheme identical to a transmission scheme in a plurality of source nodes, and the extraction of the relay signal will be discussed in greater detail later, with reference to FIG. 6. In particular, the "arraying" of the arrayed relay signal may indicate that the relay signal is arrayed so as to be identical to the transmission scheme in the source node.

The relay node may determine a relay direction of relay signals in operation 705, and in operation 707, transmit the relay signals in the determined relay direction, which will also be discussed in greater detail with reference to FIG. 6.

In descriptions thus far, a process in which a transmission node transmits a data stream, and a relay node receives and relays a data stream from a plurality of transmission nodes has been discussed in detail. In order to provide a more detailed description of the content as set forth above, an instance in which a source-relay-destination of 2×2×2 participates in cooperation transmission as shown in FIG. 6 may be assumed.

A channel gain between a first source node $S_1$ and a first relay node $V_1$ may be $g_{11}$. A channel gain between the first source node $S_1$ and a second relay node $V_1$ may be $g_{12}$. A channel gain between a second source node $S_2$ and the first relay node $V_1$ may be $g_{21}$. A channel gain between the second source node $S_2$ and a second relay node $V_2$ may be $g_{22}$. A channel gain between the first relay node $V_1$ and a first destination node $D_1$ may be $h_{11}$. A channel gain between the first relay node $V_1$ and a second destination node $D_2$ may be $h_{12}$. A channel gain between the second relay node $V_2$ and the first destination node $D_1$ may be $h_{21}$. A channel gain between the second relay node $V_2$ and the second destination node $D_2$ may be $h_{22}$.

In this instance, a transmission direction during a "t" time of the first source node $S_1$ and the second source node $S_2$ may be represented by Equation 7.

$$T_{(s_{11},s_{12},s_{21},s_{22})}[t] = T_{\vec{s}}[t] = g_{11}[t]^{s_{11}} g_{12}[t]^{s_{12}} g_{21}[t]^{s_{21}} g_{22}[t]^{s_{22}} \quad \text{[Equation 7]}$$

In particular, in Equation 7, $s_{11}$, $s_{12}$, $s_{21}$, and $s_{22}$ may be an integer greater than "0" and less than "N−1", and a value of "N" may be sufficiently large.

In this instance, a signal transmitted by an i-th source node $S_i$ may be given by Equation 4. $T_{\vec{s}}[t]$ of Equation 4 may be replaced by $T(s_{11}, s_{12}, s_{21}, s_{22})[t]$ of Equation 7.

As described above, a source node may determine a transmission direction based on a channel gain, and transmit a data stream corresponding to the determined transmission direction.

A signal received from a first relay node $V_1$ may be calculated according to Equation 8.

$$Y_{V_1}[t] = g_{11}[t]\left(\gamma \sum_{\vec{s} \in \Delta_N} T_{\vec{s}}[t] c_{1,\vec{s}}[m]\right) + \quad \text{[Equation 8]}$$

$$g_{21}[t]\left(\gamma \sum_{\vec{s} \in \Delta_N} T_{\vec{s}}[t] c_{2,\vec{s}}[m]\right) + Z_{V_1}[t]$$

$$= \gamma \sum_{\vec{s} \in \Delta_N} g_{11}[t]^{s_{11}} g_{12}[t]^{s_{12}} g_{21}[t]^{s_{21}} g_{22}[t]^{s_{22}}$$

$$\left(g_{11}[t] c_{1,\vec{s}}[m] + g_{21}[t] c_{2,\vec{s}}[m]\right) + Z_{V_1}[t]$$

$$= \gamma \sum_{\vec{s} \in \Delta_N} g_{11}[t]^{s_{11}+1} g_{12}[t]^{s_{12}} g_{21}[t]^{s_{21}} g_{22}[t]^{s_{22}} c_{1,\vec{s}}[m] +$$

$$g_{11}[t]^{s_{11}} g_{12}[t]^{s_{12}} g_{21}[t]^{s_{21}+1} g_{22}[t]^{s_{22}} c_{2,\vec{s}}[m] + Z_{V_1}[t]$$

$$= \gamma \sum_{\vec{s} \in \Delta_N} T_{(s_{11}+1, s_{12}, s_{21}, s_{22})}[t] c_{1,\vec{s}}[m] +$$

$$= T_{(s_{11}, s_{12}, s_{21}+1, s_{22})}[t] c_{2,\vec{s}}[m] + Z_{V_1}[t]$$

$$= \gamma \sum_{\vec{s} \in \Delta_{N+1}} T_{(s_{11}+1, s_{12}, s_{21}, s_{22})}[t] \left(c_{1,(s_{11}-1, s_{12}, s_{21}, s_{22})}[m]\right) +$$

$$\left(c_{1,(s_{11}, s_{12}, s_{21}-1, s_{22})}[m]\right) + Z_{V_1}[t]$$

Here, $Y_{V_1}$ may be written as $$\gamma_1 \sum_{\vec{s} \in \Delta_N} g_{11}[t]^{s_{11}+1} g_{12}[t]^{s_{12}} g_{21}[t]^{s_{21}} g_{22}[t]^{s_{22}} c_{1,\vec{s}}[m] +$$

$$g_{11}[t]^{s_{11}} g_{12}[t]^{s_{12}} g_{21}[t]^{s_{21}+1} g_{22}[t]^{s_{22}} c_{2,\vec{s}}[m] + Z_{V_1}[t]$$

because $T_{(s_{11}, s_{12}, s_{21}, s_{22})}[t] = T_{\vec{s}}[t] = g_{11}[t]^{s_{11}} g_{12}[t]^{s_{12}} g_{21}[t]^{s_{21}} g_{22}[t]^{s_{22}}$ includes a polynomial of $g_{11}[t]$, $g_{12}[t]$, $g_{21}[t]$, $g_{22}[t]$. More particularly, $g_{11}[t]$ received from the first source node $S_1$ may be written along with $g_{11}[t]^{s_{11}} g_{12}[t]^{s_{12}} g_{21}[t]^{s_{21}} g_{22}[t]^{s_{22}}$ to be represented as $g_{11}[t]^{s_{11}+1}$, and $g_{21}[t]$ may be written along with $g_{11}[t]^{s_{11}} g_{12}[t]^{s_{12}} g_{21}[t]^{s_{21}} g_{22}[t]^{s_{22}}$ to be represented as $g_{21}[t]^{s_{21}+1}$.

Equation 8 may be re-written to be represented by Equation 9.

$$Y_{V_1}[t] = \gamma \sum_{\vec{s}=(0,0,0,0)}^{(N-1,N-1,N-1,N-1)} T_{(s_{11}+1, s_{12}, s_{21}, s_{22})}[t] c_{1,\vec{s}}[m] + \quad \text{[Equation 9]}$$

$$T_{(s_{11}, s_{12}, s_{21}+1, s_{22})}[t] c_{2,\vec{s}}[m] + Z_{V_1}[t]$$

$$= \gamma \sum_{\vec{s}=(0,0,0,0)}^{(N,N,N,N)} T_{(s_{11}, s_{12}, s_{21}, s_{22})}[t]$$

$$\left(c_{1,(s_{11}-1, s_{12}, s_{21}, s_{22})}[m] + c_{1,(s_{11}, s_{12}, s_{21}-1, s_{22})}[m]\right)$$

$$+ Z_{V_1}[t]$$

$$= \gamma \sum_{\vec{s}=(0,0,0,0)}^{(N,N,N,N)} T_{(s_{11}, s_{12}, s_{21}, s_{22})}[t] u_{1,(s_{11}, s_{12}, s_{21}, s_{22})} +$$

$$Z_{V_1}[t] (\because u_{1,(s_{11}, s_{12}, s_{21}, s_{22})} = c_{1,(s_{11}-1, s_{12}, s_{21}, s_{22})}[m] +$$

$$c_{1,(s_{11}, s_{12}, s_{21}-1, s_{22})}[m])$$

Also, a signal received from a second relay node $V_2$ may be expressed by Equation 10 in an identical manner.

$$Y_{V_2}[t] = \gamma \sum_{\vec{s}=(0,0,0,0)}^{(N-1,N-1,N-1,N-1)} T_{(s_{11},s_{12}+1,s_{21},s_{22})}[t] c_{1,\vec{s}}[m] +$$

$$T_{(s_{11},s_{12},s_{21},s_{22}+1)}[t] c_{2,\vec{s}}[m] ] + Z_{V_2}[t]$$

$$= \gamma \sum_{\vec{s}=(0,0,0,0)}^{(N,N,N,N)} T_{(s_{11},s_{12},s_{21},s_{22})}[t] \big( c_{1,(s_{11},s_{12}-1,s_{21},s_{22})}[m] +$$

$$c_{1,(s_{11},s_{12},s_{21},s_{22}-1)}[m] \big) + Z_{V_2}[t]$$

$$= \gamma \sum_{\vec{s}=(0,0,0,0)}^{(N,N,N,N)} T_{(s_{11},s_{12},s_{21},s_{22})}[t] u_{2,(s_{11},s_{12},s_{21},s_{22})} +$$

$$Z_{V_2}[t] \big( \because u_{2,(s_{11},s_{12},s_{21},s_{22})} = c_{1,(s_{11},s_{12}-1,s_{21},s_{22})}[m] +$$

$$c_{1,(s_{11},s_{12},s_{21},s_{22}-1)}[m] \big)$$

Based on the aforementioned descriptions, data received during times of "t=md, md+1, . . . , (m+1)d−1" in the j-th relay node $V_j$ may be represented in a d-dimensional received signal vector as defined by Equation 11.

$$\vec{Y}_{V_j}[m] = \begin{bmatrix} Y_{V_j}[md] \\ Y_{V_j}[md+1] \\ \vdots \\ Y_{V_1}[(m+1)d-1] \end{bmatrix} = \quad \text{[Equation 11]}$$

$$\gamma \sum_{\vec{s} \in \Delta_{N+1}} \begin{bmatrix} T_{\vec{s}}[md] \\ T_{\vec{s}}[md+1] \\ \vdots \\ T_{\vec{s}}[(m+1)d-1] \end{bmatrix} u_{j,\vec{s}}[m] + \begin{bmatrix} Z_{V_j}[md] \\ Z_{V_j}[md+1] \\ \vdots \\ Z_{V_1}[(m+1)d-1] \end{bmatrix}$$

Here, $T_{\vec{s}}[t]$ may be provided in a form of differing monomials of variables $h_{s_i,v_j}[t]$ for $i,j \in \{1, \ldots, K\}$, and represented by Equation 12.

$$\vec{T}_{\vec{s}}[m] = \begin{bmatrix} T_{\vec{s}}[md] \\ T_{\vec{s}}[md+1] \\ \vdots \\ T_{\vec{s}}[(m+1)d-1] \end{bmatrix} \quad \text{[Equation 12]}$$

A relay node may define a matrix T[m] having a size of $d \times d_1$. Here, a column of T[m] may be $\vec{T}_{\vec{s}}[m]$.

$\vec{Y}_{V_1}[m]$ may be written using the matrix T[m] as expressed by Equation 13.

$$\vec{Y}_{V_j}[m] = \gamma \sum_{\vec{s} \in \Delta_{N+1}} \begin{bmatrix} T_{\vec{s}}[md] \\ T_{\vec{s}}[md+1] \\ \vdots \\ T_{\vec{s}}[(m+1)d-1] \end{bmatrix} u_{j,\vec{s}}[m] + \quad \text{[Equation 13]}$$

$$\begin{bmatrix} Z_{V_j}[md] \\ Z_{V_j}[md+1] \\ \vdots \\ T_{V_1}[(m+1)d-1] \end{bmatrix}$$

$$= \gamma T[m] \begin{bmatrix} u_{j,(0,0,0,0)} \\ u_{j,(0,0,0,1)} \\ \vdots \\ u_{j,(N+1,N+1,N+1,N+1)} \end{bmatrix} +$$

$$\begin{bmatrix} Z_{V_j}[md] \\ Z_{V_j}[md+1] \\ \vdots \\ T_{V_j}[(m+1)d-1] \end{bmatrix}$$

The relay node may multiply an inverse value of the matrix T[m] to a received signal vector, and extract an arrayed relay signal. The extracted relay signal may be defined by Equation 14.

$$\big[\hat{u}_{j,\vec{s}}[m]\big]_{\vec{s} \in \Delta_{N+1}} = \gamma^{-1} T[m]^{-1} \vec{Y}_{V_j}[m] \quad \text{[Equation 14]}$$

$$= \big[u_{j,\vec{s}}[m]\big]_{\vec{s} \in \Delta_{N+1}} +$$

$$\gamma^{-1} T[m]^{-1} \begin{bmatrix} Z_{V_j}[md] \\ Z_{V_j}[md+1] \\ \vdots \\ Z_{V_j}[(m+1)d-1] \end{bmatrix}$$

As described above, the relay node may extract a relay signal. Hereinafter, an instance in which a relay node determines a relay direction of relay signals will be described.

To determine the relay direction, a matrix may be defined by Equation 15.

$$\begin{bmatrix} b_{11}[t] & \cdots & b_{K1}[t] \\ \vdots & \ddots & \vdots \\ b_{1K[t]} & \cdots & b_{KK}[t] \end{bmatrix} = \begin{bmatrix} h_{V_1,D_1}[t] & \cdots & h_{V_K,D_1}[t] \\ \vdots & \ddots & \vdots \\ h_{V_1,D_K}[t] & \cdots & h_{V_K,D_K}[t] \end{bmatrix}^{-1} \quad \text{[Equation 15]}$$

Components on a right side of Equation 15 may be a channel gain between a relay node and a destination node. In particular, components of a matrix $$\begin{bmatrix} h_{V_1,D_1}[t] & \cdots & h_{V_K,D_1}[t] \\ \vdots & \ddots & \vdots \\ h_{V_1,D_K}[t] & \cdots & h_{V_K,D_K}[t] \end{bmatrix}$$

on the right side may be invertible, respectively, and thus, may be possible to define a matrix on a left side of Equation 15.

The relay node may determine a relay direction based on a polynomial of the defined components of $$\begin{bmatrix} b_{11}[t] & \cdots & b_{K1}[t] \\ \vdots & \ddots & \vdots \\ b_{1K}[t] & \cdots & b_{KK}[t] \end{bmatrix}$$

as given by Equation 16.

$$\tilde{T}_{s_{11},s_{12},\ldots,s_{KK}}[t] = \prod_{\substack{1 \le i \le K \\ 1 \le j \le K}} b_{ij}[t]^{s_{ij}} \qquad \text{[Equation 16]}$$

Also, a set of the relay directions may be simplified to Equation 17.

$$\tilde{\mathcal{T}}_{N+1}[t] = \{\tilde{T}_{s_{11},s_{12},\ldots,s_{KK}}[t] : (s_{11}, s_{12}, \ldots, s_{KK}) \in \Delta_{N+1}\} \qquad \text{[Equation 17]}$$

The j-th relay node Vj may transmit a signal of Equation 18 obtained through encoding a relay signal $[\hat{u}_{j,\vec{s}}[m]]_{\vec{s} \in \Delta_{N+1}}$ during times of "t=(m+1)d, (m+1)d+1, . . . , (m+1)d−1".

$$X_{V_j}[t] = \gamma' \sum_{\vec{s} \in \Delta_{N+1}} \tilde{T}_{\vec{s}}[t] \hat{u}_{j,\vec{s}}[m] \qquad \text{[Equation 18]}$$

$$= \gamma' \sum_{\vec{s} \in \Delta_{N+1}} \tilde{T}_{\vec{s}}[t] u_{j,\vec{s}}[m] + \tilde{Z}_{V_j}[t]$$

In Equation 18, γ denotes a power coefficient based on a maximum transmission power of a relay, and $\tilde{Z}_{V_j}[t]$ denotes a noise component influencing the j-th relay node $V_j$.

The transmitted relay signal may be modified to an existing transmission direction domain ($\vec{s} \in \Delta_N$) to be represented by Equation 19.

$$X_{V_j}[t] = \gamma' \sum_{\vec{s} \in \Delta_N} \tilde{T}_{\vec{s}}[t] \left( \sum_{i=1}^{K} b_{ij}[t] c_{i,\vec{s}}[m] \right) + \tilde{Z}_{V_j}[t] \qquad \text{[Equation 19]}$$

Based on the aforementioned descriptions, a signal transmitted during times of "t=md, md+1, . . . , (m+2)d−1" in the j-th relay node $V_j$ may be represented in the d-dimensional received signal vector as defined by Equation 20.

$$\begin{bmatrix} X_{V_1}[t] \\ \vdots \\ X_{V_K}[t] \end{bmatrix} = \gamma' \sum_{\vec{s} \in \Delta_N} \tilde{T}_{\vec{s}}[t] \begin{bmatrix} b_{11}[t] & \cdots & b_{K1}[t] \\ \vdots & \ddots & \vdots \\ b_{1K}[t] & \cdots & b_{KK}[t] \end{bmatrix} \begin{bmatrix} c_{1,\vec{s}}[m] \\ \vdots \\ c_{K,\vec{s}}[m] \end{bmatrix} + \begin{bmatrix} \tilde{Z}_{V_1}[t] \\ \vdots \\ \tilde{Z}_{V_K}[t] \end{bmatrix} \qquad \text{[Equation 20]}$$

Based on the preceding, the relay node may extract the relay signal, and subsequent to determining the relay direction, transmit the relay signal in the determined relay direction.

Figure 8:
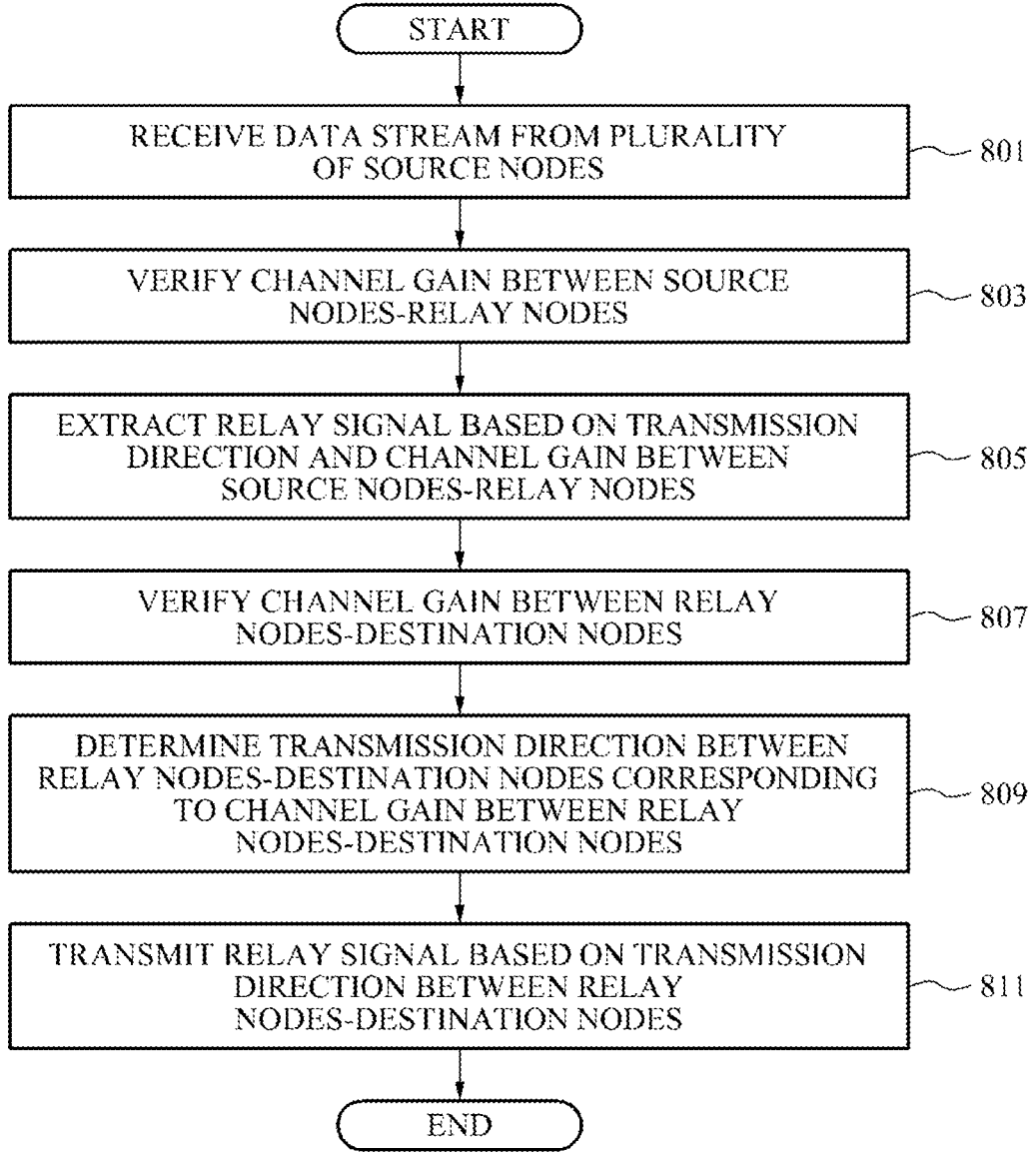
FIG. 8 is a flowchart which illustrates an operation of a relay node based on the foregoing descriptions.

FIG. 8 illustrates an operation of a relay node based on the descriptions in the foregoing.

In operation 801, the relay node may receive a data stream from a plurality of source nodes.

In operation 803, the relay node may verify a channel gain between a source node and a relay node.

In operation 805, the relay node may extract an arrayed relay signal, based on a transmission direction between the source node-relay node and the channel gain between the source node-relay node.

In operation 807, the relay node may verify a channel gain between a relay node and a destination node.

In operation 809, the relay node may determine a transmission direction between the relay node and the destination node corresponding to the channel gain of the relay node and the destination node.

In operation 811, the relay node may transmit a relay signal based on the transmission direction between the relay node and the destination node.

Figure 9:
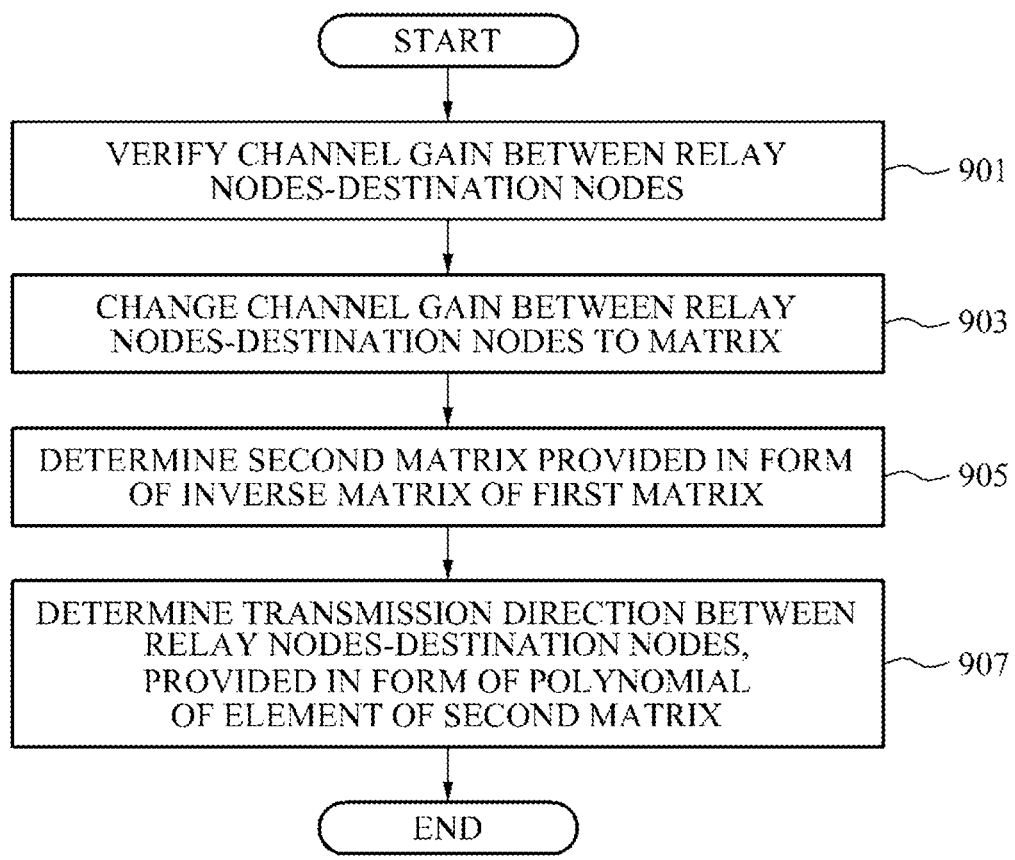
FIG. 9 is a flowchart which illustrates a method for determining a relay direction according to an exemplary embodiment.

FIG. 9 illustrates a method for determining a relay direction according to an exemplary embodiment.

In operation 901, the relay node may verify a channel gain between a relay node and a destination node.

The relay node may generate a first matrix through changing the channel gain between the relay node and a destination node to a form of a matrix in operation 903, and determine a second matrix, provided in a form of an inverse matrix of the first matrix in operation 905.

In operation 907, the relay node may determine a transmission direction between the relay node and the destination node, for example, a polynomial of an element of the second matrix.

Thus far, a configuration of relaying a relay signal in a relay node has been described, and hereinafter, a configuration of receiving a relay signal from a destination node and decoding will be described.

Figure 10:
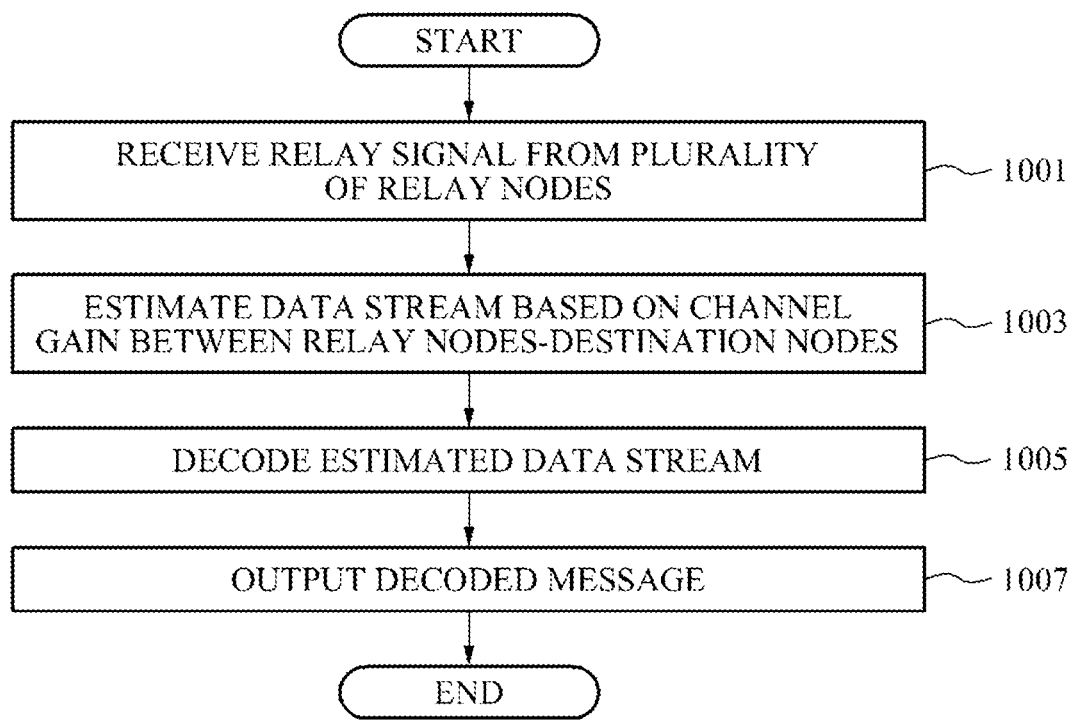
FIG. 10 is a flowchart which illustrates an operation of a destination node according to an exemplary embodiment.

FIG. 10 illustrates an operation of a destination node according to an exemplary embodiment.

In operation 1001, the destination node may receive a relay signal from a plurality of relay nodes.

A signal received from first through K-th destination nodes during a "t" time may be represented by Equation 21.

$$\begin{bmatrix} Y_{D_1}[t] \\ \vdots \\ Y_{D_K}[t] \end{bmatrix} = \begin{bmatrix} h_{V_1,D_1}[t] & \cdots & h_{V_K,D_1}[t] \\ \vdots & \ddots & \vdots \\ h_{V_1,D_K}[t] & \cdots & h_{V_K,D_K}[t] \end{bmatrix} \begin{bmatrix} X_{V_1}[t] \\ \vdots \\ X_{V_K}[t] \end{bmatrix} + \begin{bmatrix} Z_{D_1}[t] \\ \vdots \\ Z_{D_K}[t] \end{bmatrix} \qquad \text{[Equation 21]}$$

$$= \begin{bmatrix} b_{11}[t] & \cdots & b_{K1}[t] \\ \vdots & \ddots & \vdots \\ b_{1K}[t] & \cdots & b_{KK}[t] \end{bmatrix}^{-1} \begin{bmatrix} X_{V_1}[t] \\ \vdots \\ X_{V_K}[t] \end{bmatrix} + \begin{bmatrix} Z_{D_1}[t] \\ \vdots \\ Z_{D_K}[t] \end{bmatrix}$$

$$= \gamma' \sum_{\vec{s} \in \Delta_N} \tilde{T}_{\vec{s}}[t] \begin{bmatrix} c_{1,\vec{s}}[m] \\ \vdots \\ c_{K,\vec{s}}[m] \end{bmatrix} + \begin{bmatrix} b_{11}[t] & \cdots & b_{K1}[t] \\ \vdots & \ddots & \vdots \\ b_{1K}[t] & \cdots & b_{KK}[t] \end{bmatrix}^{-1} \begin{bmatrix} \tilde{Z}_{V_1}[t] \\ \vdots \\ \tilde{Z}_{V_K}[t] \end{bmatrix} +$$

$$\begin{bmatrix} Z_{D_1}[t] \\ \vdots \\ Z_{D_K}[t] \end{bmatrix}$$

A relationship of Equation 20 may be substituted with respect to $$\begin{bmatrix} X_{V_1}[t] \\ \vdots \\ X_{V_K}[t] \end{bmatrix}$$

as written in an equation of $$\begin{bmatrix} b_{11}[t] & \cdots & b_{K1}[t] \\ \vdots & \ddots & \vdots \\ b_{1K}[t] & \cdots & b_{KK}[t] \end{bmatrix}^{-1} \begin{bmatrix} X_{V_1}[t] \\ \vdots \\ X_{V_K}[t] \end{bmatrix} + \begin{bmatrix} Z_{D_1}[t] \\ \vdots \\ Z_{D_K}[t] \end{bmatrix} =$$

$$\gamma' \sum_{\vec{s} \in \Delta_N} \tilde{T}_{\vec{s}}[t] \begin{bmatrix} c_{1,\vec{s}}[m] \\ \vdots \\ c_{K,\vec{s}}[m] \end{bmatrix} + \begin{bmatrix} b_{11}[t] & \cdots & b_{K1}[t] \\ \vdots & \ddots & \vdots \\ b_{1K}[t] & \cdots & b_{KK}[t] \end{bmatrix}^{-1} \begin{bmatrix} \tilde{Z}_{V_1}[t] \\ \vdots \\ \tilde{Z}_{V_k}[t] \end{bmatrix} + \begin{bmatrix} Z_{D_1}[t] \\ \vdots \\ Z_{D_K}[t] \end{bmatrix}.$$

Based on the descriptions in the foregoing, a signal received from a j-th destination node $D_j$ during times of "t=md, md+1, ... , (m+1)d−1" may be derived from Equation 22.

$$Y_{D_j}[t] = \gamma' \sum_{\vec{s} \in \Delta_N} \tilde{T}_{\vec{s}}[t] c_{j,\vec{s}}[m] + \tilde{Z}_{D_j}[t] \quad \text{[Equation 22]}$$

$\tilde{Z}_{D_j}[t]$ of Equation 22 may represented by $$\begin{bmatrix} b_{11}[t] & \cdots & b_{K1}[t] \\ \vdots & \ddots & \vdots \\ b_{1K}[t] & \cdots & b_{KK}[t] \end{bmatrix}^{-1} \begin{bmatrix} \tilde{Z}_{V_1}[t] \\ \vdots \\ \tilde{Z}_{V_K}[t] \end{bmatrix} + \begin{bmatrix} Z_{D_1}[t] \\ \vdots \\ Z_{D_K}[t] \end{bmatrix}.$$

Based on the descriptions in the foregoing, a signal received from the j-th destination node $D_j$ during the times of "t=md, md+1, ... , (m+1)d−1" may be given by Equation 23.

$$\vec{Y}_{D_j}[m+1] = \begin{bmatrix} Y_{D_j}[(m+1)d] \\ Y_{D_j}[(m+1)d+1] \\ \vdots \\ Y_{D_j}[(m+2)d-1] \end{bmatrix} \quad \text{[Equation 23]}$$

$$= \gamma' \sum_{\vec{s} \in \Delta_N} \begin{bmatrix} \tilde{T}_{\vec{s}}[(m+1)d] \\ \tilde{T}_{\vec{s}}[(m+1)d+1] \\ \vdots \\ \tilde{T}_{\vec{s}}[(m+2)d-1] \end{bmatrix} c_{j,\vec{s}}[m] +$$

$$\begin{bmatrix} \tilde{Z}_{D_j}[(m+1)d] \\ \tilde{Z}_{D_j}[(m+1)d+1] \\ \vdots \\ \tilde{Z}_{D_j}[(m+2)d-1] \end{bmatrix}$$

As $T_g[t]$ of Equation 23 is represented by a monomial with respect to a channel gain $h_{V_i,D_j}[t]$ for $i,j \in \{1, \ldots , K\}$, $\vec{T}_{\vec{s}}[m+1]$ of Equation 24 may be linearly independent.

$$\vec{\tilde{T}}_{\vec{s}}[m+1] = \begin{bmatrix} \tilde{T}_{\vec{s}}[(m+1)d] \\ \tilde{T}_{\vec{s}}[(m+1)d+1] \\ \vdots \\ \tilde{T}_{\vec{s}}[(m+2)d-1] \end{bmatrix} \quad \text{[Equation 24]}$$

Accordingly, a destination node may decode a $|\Delta_N| = N^{K^2}$ number of symbols from among a "d" number of received signals.

In operation 1003, the destination node may estimate a data stream, based on a channel gain between a relay node-destination node.

The destination node may define a matrix $\tilde{T}[m]$, and a column of the matrix $\tilde{T}[m]$ may be configured by a first $N^{K^2}$ number of elements of $\vec{\tilde{T}}_{\vec{s}}[m]$.

The destination node may estimate a data stream $[\hat{c}_{j,\vec{s}}[m]]_{\vec{s} \in \Delta_N}$ as defined by Equation 25.

[Equation 25]

$$[\hat{c}_{j,\vec{s}}[m]]_{\vec{s} \in \Delta_N} = \gamma'^{-1} \tilde{T}[m]^{-1} \begin{bmatrix} Y_{D_j}[(m+1)d] \\ Y_{D_j}[(m+1)d+1] \\ \vdots \\ Y_{D_j}[(m+1)d+N^{K^2}] \end{bmatrix}$$

$$= [c_{j,\vec{s}}[m]]_{\vec{s} \in \Delta_N} + \gamma'^{-1} \tilde{T}[m]^{-1} \begin{bmatrix} \tilde{Z}_{V_j}[(m+1)d] \\ \tilde{Z}_{V_j}[(m+1)d+1] \\ \vdots \\ \tilde{Z}_{V_j}[(m+1)d+N^{K^2}] \end{bmatrix}$$

The destination node may perform vector multiplication on an inverse matrix of the matrix $\tilde{T}[m]$ and the received signal as expressed by Equation 25. The destination node may estimate the data stream $[\hat{c}_{j,\vec{s}}[m]]_{\vec{s} \in \Delta_N}$ based on a result of the vector multiplication.

The destination node may decode the estimated data stream in operation 1005, and output a decoded message in operation 1007. For example, the destination node may perform decoding using a Gaussian random codebook.

Degrees of freedom of cooperation transmission as described above may be determined by Equation 26.

$$\frac{N^{K^2}}{d} = \frac{N^{K^2}}{(N+1)^{K^2}} = \left(\frac{N}{N+1}\right)^{K^2} \quad \text{[Equation 26]}$$

An instance of the degrees of freedom converging to "1" as "N" diverges toward infinity may be verified in Equation 26, and thereby, neutralizing of interference by the cooperation transmission may be verified.

The above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for controlling a first node transmitting data to a second node group, the method comprising:
   dividing the data into at least one sub-data;
   encoding the at least one sub-data to a data stream;
   selecting one node from the second node group as a destination for the data stream based on a polynomial of channel gains between a source node group and the second node group; and
   transmitting the data stream to the selected node,
   wherein each of the source node group and the second node group includes a plurality of nodes,
   wherein the source node group includes the first node and communicates with the second node group, and
   wherein the polynomial comprises a product of channel gains between each node of the source node group and each node of the second node group.

2. The method of claim 1, wherein the encoding comprises:
   encoding the at least one sub-data, based on a Gaussian random codebook.

3. The method of claim 1, wherein the channel gains varies based on a unit of a predetermined number of time slots, and
   wherein the transmitting comprises transmitting the data stream during the predetermined number of time slots.

4. A method for controlling a relay node relaying a signal between a source node group and a destination node group, the method comprising:
   receiving a data stream from at least one source node of the source node group;
   extracting at least one relay signal from the received data stream;
   selecting at least one node from the destination node group as a destination for the at least one relay signal based on a polynomial of channel gains between a relay node group and the destination node group; and
   transmitting the at least one relay signal to the at least one node,
   wherein each of the source node group, the relay node group, and the destination node group includes a plurality of nodes,
   wherein the relay node group includes the relay node and relays data between the source node group and the destination node group, and
   wherein the polynomial comprises a product of channel gains between each node of the relay node group and each node of the destination node group.

5. The method of claim 4, wherein the extracting of the at least one relay signal comprises:
   extracting a transmission scheme for the at least one relay signal that is identical to a transmission scheme used by the source node group to transmit the data stream.

6. The method of claim 4, wherein the selecting comprises:
   verifying a channel gain between the relay node and the destination node group;
   generating a first matrix using the channel gain;
   generating a second matrix, wherein the second matrix is an inverse matrix of the first matrix; and
   determining a transmission direction based on a polynomial of an element of the second matrix.

7. The method of claim 4, wherein channel gains between the source node group and the relay node and the channel gains between the relay node and the destination node group vary with time.

8. The method of claim 7,
   wherein the channel gains between the source node group and the relay node and the channel gains between the relay node and the destination node group vary based on a unit of a predetermined number of time slots, and
   wherein the transmitting of the at least one relay signal comprises transmitting the at least one relay signal during the predetermined number of time slots.

9. A method for controlling a destination node communicating with a relay node group relaying data encoded in a source node group, the method comprising:
   receiving a relay signal from the a relay node group according to a relay direction between the relay node group and a destination node group;
   estimating a data stream from the relay signal received, based on channel gains between the relay node group and a destination node group;
   decoding the estimated data stream; and
   outputting the decoded estimated data stream,
   wherein each of the source node group, the relay node group, and the destination node group includes a plurality of nodes,
   wherein the destination node is selected from the destination node group as a destination for the relay signal based on a polynomial of channel gains between the relay node group and the destination node group,
   wherein the destination node is one of the destination node group includes the destination node and communicates with the relay node group, and
   wherein the polynomial comprises a product of channel gains between each node of the relay node group and each of the destination node group.

10. The method of claim 9, wherein the estimating of the data stream comprises:
    determining a third matrix based on the relay direction;
    vector-multiplying an inverse matrix of the third matrix and the received relay signal; and
    estimating the data stream based on a result of the vector-multiplication.

11. The method of claim 9,
    wherein the relay direction is based on a polynomial of an element of a second matrix, and
    wherein the second matrix is an inverse matrix of a first matrix obtained through changing to form the first matrix from a channel gain between the relay node group and the destination node group.

12. The method of claim 9, wherein at least one of the channel gains varies with time.

13. The method of claim 12,
wherein the channel gains between the relay node group and the destination node vary based on a unit of a predetermined number of time slots, and
wherein the receiving of the relay signal comprises receiving the relay signal during the predetermined number of time slots.

14. A first node configured to transmit data to a second node group, the first node comprising:
a controller configured to encode at least one divided sub-data into at least one sub-data, and configured to select at least one node from the second node group as a destination for the at least one sub-data based on a polynomial of channel gains between a source node group and the second node group; and
a communicator configured to transmit the at least one sub-data to the at least one node respectively,
wherein each of the source node group and the second node group includes a plurality of nodes,
wherein the source node group includes the first node and communicates with the second node group, and
wherein the polynomial comprises a product of channel gains between each node of the source node group and each of the second node group.

15. A relay node configured to relay a signal between a source node group and a destination node group, the relay node comprising:
a communicator configured to receive a data stream from at least one source node of the source node group; and
a controller configured to extract at least one relay signal from the received data stream, and configured to select at least one node from the destination node group as a destination for the at least one relay signal based on a polynomial of channel gains between a relay node group and the destination node group,
wherein each of the source node group, the relay node group, and the destination node group includes a plurality of nodes,
wherein the communicator transmits the at least one relay signal to the at least one node respectively,
wherein the relay node group includes the relay node and relays data between the source node group and the destination node group, and
wherein the polynomial comprises a product of channel gains between each node of the relay node group and each node of the destination node group.

* * * * *